US012671176B2

(12) United States Patent
Novak

(10) Patent No.: US 12,671,176 B2
(45) Date of Patent: Jun. 30, 2026

(54) REFLECTIVE PHASE SHIFTER FOR USE IN PHASED ARRAYS

(71) Applicant: Novaa Ltd., Dublin, OH (US)

(72) Inventor: Markus Novak, Chicago, IL (US)

( * ) Notice: Subject to any disclaimer, the term of this patent is extended or adjusted under 35 U.S.C. 154(b) by 320 days.

(21) Appl. No.: 18/113,191

(22) Filed: Feb. 23, 2023

(65) Prior Publication Data

US 2024/0243472 A1 Jul. 18, 2024

Related U.S. Application Data

(60) Provisional application No. 63/313,393, filed on Feb. 24, 2022.

(51) Int. Cl.

*H01Q 3/46* (2006.01)
*H01P 1/18* (2006.01)
*H01Q 3/44* (2006.01)

(52) U.S. Cl.

CPC ............... *H01Q 3/443* (2013.01); *H01P 1/18* (2013.01); *H01P 1/184* (2013.01); *H01Q 3/46* (2013.01)

(58) Field of Classification Search

CPC .. H01Q 3/443; H01Q 3/46; H01P 1/18; H01P 1/184
USPC ......................... 333/24.1, 138; 342/372, 753
See application file for complete search history.

(56) References Cited

U.S. PATENT DOCUMENTS

| | | | | |
|---|---|---|---|---|
| 3,423,699 A * | 1/1969 | Hines | H01P 1/185 333/156 |
| 5,136,265 A | 8/1992 | Pritchett | |
| 6,667,714 B1 | 12/2003 | Solondz | |
| 2018/0083813 A1 | 3/2018 | Novak et al. | |
| 2018/0166779 A1 | 6/2018 | Feria et al. | |
| 2021/0376465 A1 | 12/2021 | Dastjerdi et al. | |

FOREIGN PATENT DOCUMENTS

| | | |
|---|---|---|
| CN | 108539417 B | 12/2020 |

OTHER PUBLICATIONS

International Search Report and Written Opinion of the International Searching Authority for International Patent App. No. PCT/US2023/013673 dated as mailed on Jul. 19, 2023 (9 pages).

* cited by examiner

*Primary Examiner* — Rakesh B Patel

(57) ABSTRACT

A system, comprising a device including a circuit configured to produce a phase shift in a reflected signal, wherein a plurality of phase bits, which may be either switchable or static, are situated in parallel relative to one another within the device, wherein each switchable phase bit operates on a fraction of incident signal power, and wherein reflections from all parallel bits are recombined into a single signal reflected from the phase shifting device.

11 Claims, 16 Drawing Sheets

REFLECTIVE PHASE SHIFTER FOR USE IN PHASED ARRAYS

CROSS-REFERENCE TO RELATED APPLICATIONS

This patent application claims the benefit of U.S. Provisional Patent Application Ser. No. 63/313,393 filed on Feb. 24, 2022, and entitled “Reflective Phase Shifter For Use In Phased Arrays”, the disclosure of which is incorporated herein in its entirety and made part of the present U.S. utility patent application for all purposes.

BACKGROUND

The disclosed technology relates in general to phase shifters used with phased arrays, and more specifically to systems, methods, and devices that include one or more reflective phase shifters for use, for example, in phased arrays.

Phased arrays are an established technology that includes leveraging a collection of antennas which operate in concert to produce a controlled radiation pattern. Modification of the phase or amplitude of the signal across some or all elements of the array is used to alter the radiation pattern. The minimal components of an example phased array are shown in FIG. 1, including a signal source, distribution among the elements, phase shifting, and the radiating elements. In practice, numerous other operations can or must be added to this signal chain, including amplification, filtering, and switching, as needed. FIG. 1 provides a block diagram of a simple phased array, wherein a single input signal is distributed among multiple antenna elements and phase shifts are applied along each path (phase shifted output signal), causing the resulting plane wave to point away from broadside (steered plane wave).

Often it is desirable for these phase shifts to be electronically controlled, such that the phase shifts can be reassigned at will, thereby allowing the direction of radiation of the array to be controlled without the need for moving parts. This is accomplished by a device referred to as a phase shifter. Many designs of such devices are known with the most common example architecture being illustrated in FIG. 2. Specifically, this architecture includes a sequence of phase shifting stages, wherein each stage applies one of two possible phases to the signal. For a sequence of N stages then, typically $2^N$ discrete phase states can be realized, and is said to have N bits of phase resolution. A typical value of N ranges from 4-7 bits. FIG. 2 depicts a specific example layout of a conventional phase shifter having multiple binary switched stages in series (left to right in the Figure). Generally, N stages are required to produce N bits of resolution. Many techniques exist to implement individual stages, each of which effects one of two different phase shifts to the signal. Critically, attenuation of the input signal accumulates in each sequential stage, meaning the total loss will be approximately N times that of any individual stage.

Ideally, such a device would be lossless; however, in practice each stage does incurs some signal loss (e.g., cumulative losses shown in FIG. 2). Importantly, in the conventional series layout, signal loss at each phase shifting stage accumulates, resulting in a total loss through the device on the order of N times that of each individual stage. The total insertion loss of commercially available solid state phase shifters is typically 5-10 dB. Such losses are typically compensated for by amplification, thereby increasing power consumption, thermal generation, and complexity of the array. Therefore, a phase shifter architecture that reduces signal loss is highly desirable, with significant cost, power, and complexity savings being realized with the use of such a phase shifter in phased arrays.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of “a” or “an” should be interpreted to mean “at least one” or “one or more”.

One implementation of the disclosed technology provides a system comprising a device including a circuit configured to produce a phase shift in a reflected signal, wherein a plurality of phase bits, which may be either switchable or static, are situated in parallel relative to one another within the device, wherein each phase bit operates on a fraction of incident signal power, and wherein reflections from all parallel bits are recombined into a single signal reflected from the phase shifting device.

The device may comprise N switchable parallel phase bits, wherein each bit is switchable between two states, and wherein the reflection from the circuit can take on $2^N$ unique phase states, which are widely distributed from 0-360°. The value of N may span 3-8 switchable phase bits. The system may further comprise at least one sub-circuit having at least one binary switched phase bit, wherein the sub-circuit is configured as a transmission line circuit, and wherein a single transmission line terminates in a switch, which in a conducting state shorts the line to ground, and in an isolating state emulates an open circuit. The system may further comprise at least one sub-circuit having at least one binary switched phase bit, wherein the sub-circuit is configured as a transmission line circuit, wherein the transmission line terminates in an open circuit and along its length a switch shunts to ground, and wherein when in a conducting state, the transmission line is shorted with a reduced effective length, and when in an isolating state, the connection to ground is blocked and the open termination and full length of the transmission line determines impedance. The system may further comprise at least one sub-circuit having at least one binary switched phase bit, wherein the sub-circuit is configured as a transmission line circuit, wherein the transmission line terminates in a short circuit, and wherein the transmission line is segmented into two sections by a series switch. The system may further comprise at least one sub-circuit having at least one binary switched phase bit, wherein the sub-circuit is configured as a transmission line circuit, wherein a first transmission line is connected to a common input, wherein a second transmission line is isolated, wherein one of the transmission lines is terminated in a short circuit, and wherein the other transmission line is terminated in an open circuit. The system may further comprise at least one sub-circuit having at least one binary switched phase bit, wherein the sub-circuit is configured as a transmission line circuit, wherein the transmission line terminates in a short circuit, and wherein along the length of the transmission line a switch shunts to ground. The system may further comprise at least one sub-circuit having at least one binary switched phase bit, wherein the sub-circuit is configured as a transmission line circuit, wherein transmission line terminates in an open circuit, and wherein the transmission line is segmented into two sections by a series switch. The switchable phase bits may be configured such that in at least one state inputs of all switchable phase bits are DC-coupled to ground, and in at least one other state inputs of all switchable phase bits are a DC high impedance or open circuit. The device may include a set of parallel sub-circuit bits, wherein a subset of bits is operated at a first frequency (f1), and another subset of bits operates a second frequency (f2), and wherein individual bits may be shared across multiple subsets, and any number of subsets or bits can be implemented. In any of the disclosed implementations, the transmission lines may be replaced or augmented by capacitors or inductors having the equivalent effect.

Another implementation of the disclosed technology provides a system, comprising a device including a circuit configured to produce a phase shift in a reflected signal, wherein a plurality of phase bits, which may be either switchable or static, are situated in parallel relative to one another within the device, wherein each phase bit operates on a fraction of incident signal power, and wherein reflections from all parallel bits are recombined into a single signal reflected from the phase shifting device; and an antenna, wherein the antenna is a single antenna or an array of antennas.

The antenna may be terminated with the phase shifting circuit such that the combined system reflects impinging waves with an altered phase, based on the state of the phase shifter circuit. The antenna may convey signals to and from an external system but is shunted by the phase shifting circuit such that impedance matching, phase, and operating frequency of the antenna are tuned by controllable reactive impedance presented by the phase shifting device. The array of antennas may include individual antennas each connected to a reflective phase shifting circuit, wherein through selection of predetermined phases at each circuit, incident signals impinging on the array can be steered or focused in one or more desired directions. At least one circuit may further include a static phase adjustment, and a tunable phase shifting circuit. The stationary illuminating feed antenna may be fixed in place above the array such that radiation of the feed antenna illuminates the array. The array of antennas may be placed conformal against the body or skin of a host platform, wherein the illuminating feed antenna is placed in a housing, the housing being aerodynamic in exterior shape and including non-conducting materials that do not impact radiating properties of the array. The housing may contain a plurality of feed antennas and the conformal portion of the housing may contain a plurality of arrays of reflective phase shifting elements, wherein the different feed antennas and reflective phase shifting elements may operate at different frequencies, may have different polarizations, may be independently controlled, and may be used for exclusively for transmission or reception, respectively.

Still another implementation of the disclosed technology provides a system comprising a device including a circuit configured to produce a phase shift in a reflected signal, wherein a plurality of phase bits, which may be either switchable or static, are situated in parallel relative to one another within the device, wherein each phase bit operates on a fraction of incident signal power, wherein reflections from all parallel bits are recombined into a single signal reflected from the phase shifting device, and wherein input incident signals and output reflected signals are present at different ports on the device.

Two reflective phase shifting loads may be placed at two non-isolated ports of a 90° hybrid coupler. The two loads may be identical in design and may be set to identical states or configurations. Implementations of the disclosed system may be configured for use with radio frequency waves, acoustic domains, or optical domains. Certain implementations of the disclosed technology may be configured for use with integrated circuits, printed circuit boards, chips, and the like.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein:

FIGS. 17A-17C are measurement data graphs of phase shifters implementing the disclosed reflective phase shifting device architecture; wherein FIG. 17A depicts the measured insertion loss of a 3-bit reflective phase shifter, averaged across all phase states; wherein FIG. 17B depicts the measured phase response of a 3-bit reflective phase shifter where each curve represents a different selectable phase state, and the 3-bit device produces 8 unique phase states; and wherein FIG. 17C depicts the measured phase response of a 4-bit phase shifter where each curve represents a different selectable phase state, and the 4-bit device produces 16 unique phase states.

DETAILED DESCRIPTION

Figure 1:
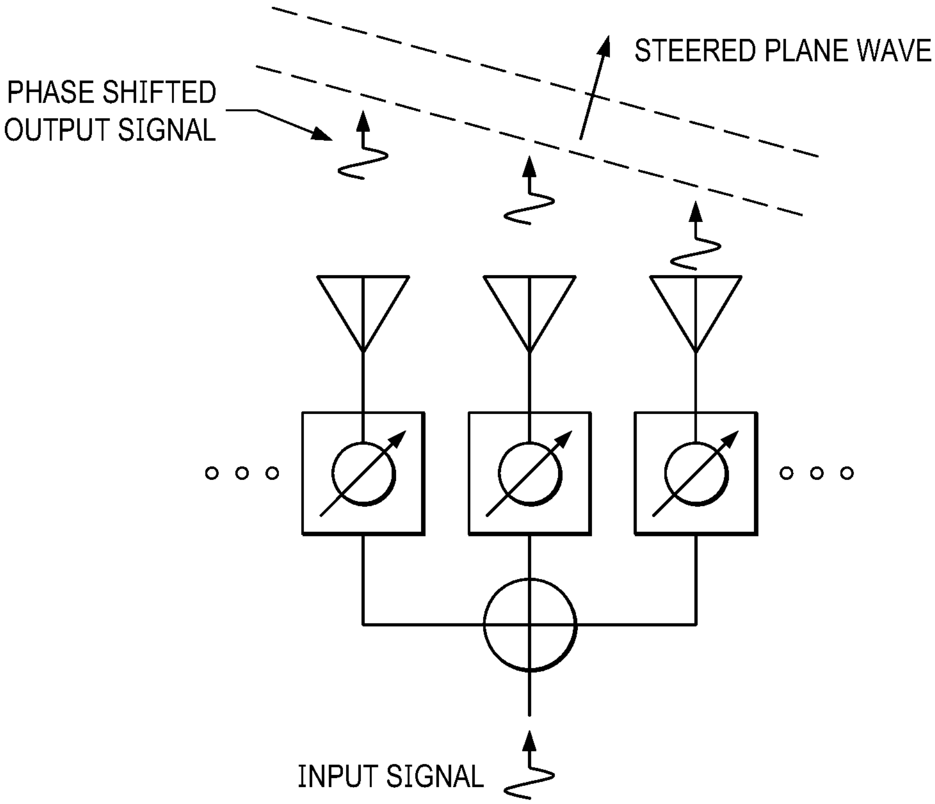
FIG. 1 is a block diagram of an example simple phased array, wherein a single input signal is distributed among multiple antenna elements and phase shifts are applied along each path, causing the resulting plane wave to point away from broadside.
Figure 2:
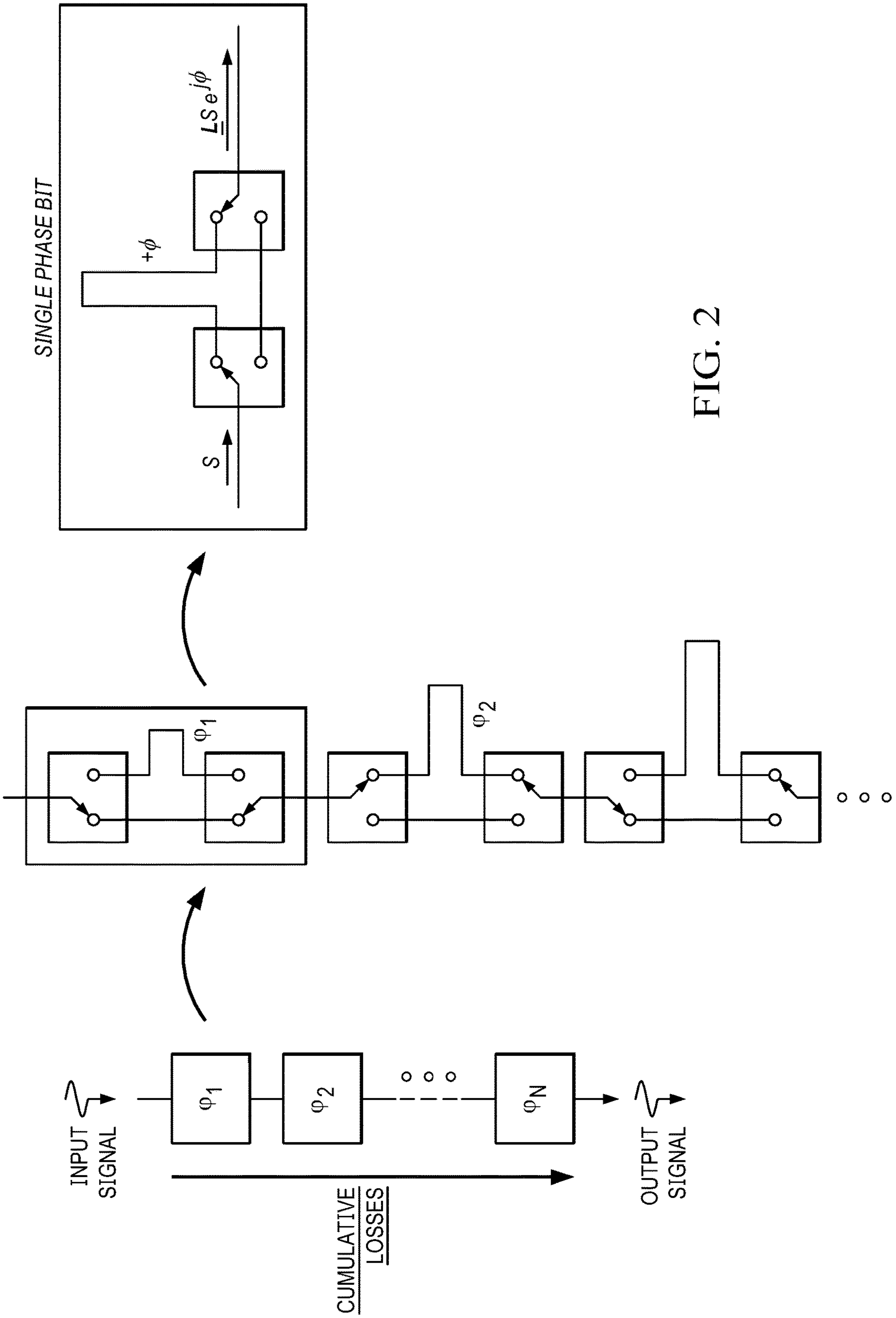
FIG. 2 depicts an example layout of a conventional phase shifter having multiple binary switched stages in series, wherein the individual binary switched stages are shown left to right in the Figure.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel. Finally, the descriptions and drawings included herein typically contain a minimum number of components required for system or device operability or functionality; however, numerous additional components may be included in or are aspects of the disclosed technology. Accordingly, the disclosed technology is not limited to or by the disclosed components.

Phased array antennas are a highly useful technology in which a common signal is radiated or received from many elements of an array simultaneously. Importantly, electronic control of the signal phase at each element allows the resulting beam to be steered in the desired direction without mechanically pointing the antenna. As discussed previously, this operation is typically accomplished with a device or circuit referred to a phase shifter. However, current phase shifters incur high signal loss, resulting in the need for amplification, which in turn results in significant power consumption, heat generation, and increased complexity and cost. The disclosed technology provides a uniquely low-loss and wideband phase shifter that allows for significant simplification and hardware reduction in phased arrays. Specific array architectures leveraging the disclosed technology are also described herein.

Reflective Phase Shifting Element

Figure 3:
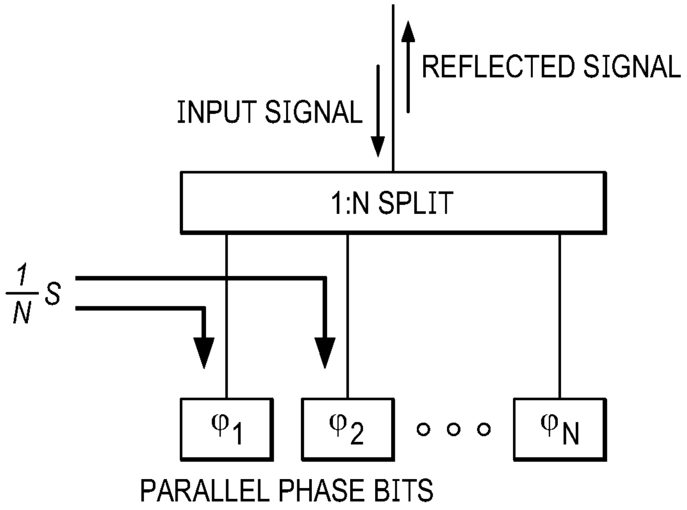
FIG. 3 depicts an example circuit for producing a phase shift in a reflected signal, wherein a plurality of switchable phase bits are situated in parallel relative to one another, wherein each switchable phase bit operates on a fraction of incident signal power, and wherein reflections from all parallel bits are recombined into a single signal reflected from the device.

Various implementations of the disclosed technology provide a novel phase shifting circuit. This circuit places a collection of switchable phase bits in parallel, as shown in FIG. 3. The partial reflections from each bit are recombined and the total reflected signal can be made to have a phase shift with respect to the incident signal based on the combination of states of the constituent phase bits. Due to parallel placement, each bit interacts with only a portion of the input signal power, and the losses incurred in each bit are not cumulative. Accordingly, significantly lower losses are achieved and in general a circuit of N bits resolution has approximately constant insertion loss. FIG. 3 depicts an example circuit for producing a phase shift in a reflected signal, wherein a plurality of switchable phase bits are situated in parallel relative to one another, wherein each operates on a fraction of incident signal power, and wherein reflections from all parallel bits are recombined into a single signal reflected from the complete phase shifting device. The phase of the reflected signal may be shifted with respect to the incident signal, based on the unique state of all parallel bits in the device.

The disclosed circuit is reflective in nature and, in essence, synthesizes an arbitrary reactive impedance, such that the reflection coefficient of this equivalent impedance has a desired phase shift. Similarly, individual phase bits are reflective complex loads and some or all of these loads can switch between two or more states, corresponding to different impedances and thus different reflection coefficients. The net reflected signal of the disclosed device may take on a unique phase with each possible combination of the states of the phase bits. In an example implementation, the disclosed device comprises N parallel phase bits, each being switchable between two states, designed such that the reflection from the complete circuit can take on $2^N$ unique phase states, which are widely equally distributed from 0-360°. A typical value of N spans 4-7 bits, though any number>0 can be utilized.

Unlike a conventional series configuration, the phase of the reflected signal is not simply the sum of the phase contribution from each bit. The reflected phase is the angle of the complex reflection coefficient:

$$\Gamma = \frac{Z_0 - Z_{in}}{Z_0 + Z_{in}} \tag{1}$$

Wherein $Z_0$ is the system impedance, and $Z_{in}$ is the circuit's input impedance, described as:

$$Z_{in} = \left(\sum Z_i^{-1}(x)\right)^{-1} \tag{2}$$

Wherein $Z_i(x)$ is the impedance of the i-th phase bit in state x.

As such, the design of the phase bits is important. In general form, the "phase bit" sub-circuit is implemented as a switchable reactive impedance. The real component of impedance is ideally zero, and any value above this will introduce losses. Many such topologies can be developed which are suitable for this architecture; however, several specific implementations are disclosed below.

Figure 6:
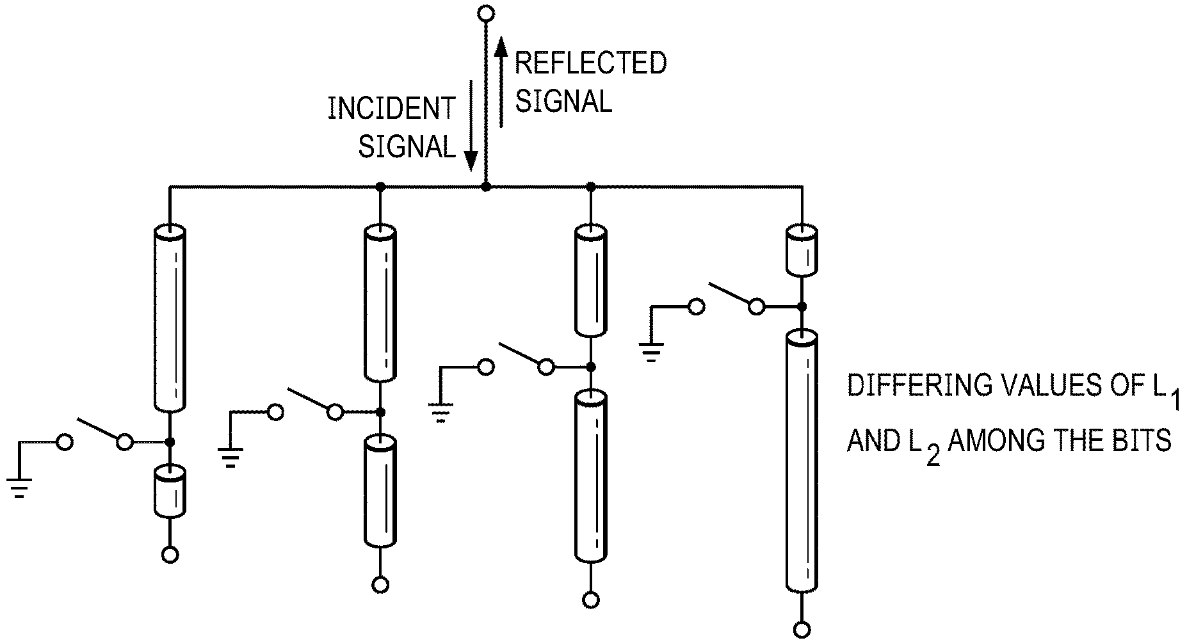
FIG. 6 depicts an example implementation of the reflective phase shifting device architecture depicted in FIG. 3, utilizing one of the sub-circuit layouts depicted in FIGS. 4A-4D, wherein the circuit parameters are varied across the parallel phase bits, and wherein the depicted device includes 4 bits of phase resolution, thereby producing 16 possible phase states.

Four example implementations of a single binary switched phase bit are depicted in FIGS. 4A-4D. More specifically, this sub-circuit represents one implementation of the parallel phase bit depicted in FIG. 3. One or more of these sub-circuits, having different values of the design parameters, are utilized in parallel. By way of example, one specific design of a 4-bit phase shifting device, utilizing one of the suggested sub-circuits is depicted in FIG. 6. FIG. 6 depicts an example implementation of the reflective phase shifting device architecture depicted in FIG. 3, utilizing one of the sub-circuit layouts depicted in FIGS. 4A-4D, wherein the circuit parameters are varied across the parallel phase bits. The device shown includes 4 bits of phase resolution, thereby producing 16 possible phase states.

The circuits depicted in FIGS. 4A-4D are implemented as transmission line circuits, which is beneficial for low-cost fabrication, though equivalent circuits using lumped elements such as capacitors or inductors are also possible. Each circuit contains a switch, which is either electrically conductive, or isolating at the design frequency, being actuated by some external control signal. Various methods exist for implementing the switch, including transistors, PIN diode, Micro-Electromechanical System (MEMS), and numerous others. The input impedance of the indicated circuits can be readily computed using methods known to those skilled in the art. A basic structure for each disclosed circuit is described below.

In a first implementation (see FIG. 4A), a single transmission line terminates in a switch, which in the conducting state shorts the line to ground and in the isolating state emulates an open circuit. In a second implementation (see FIG. 4B), a transmission line terminates in an open circuit, and along its length a switch shunts to ground. In the conducting state, the transmission line is shorted with a reduced effective length, while in the isolating state the connection to ground is blocked and the open termination and full length of the line determines impedance. In a third implementation (see FIG. 4C), a transmission line terminates in a short circuit, wherein the termination line is segmented into two sections by a series switch. Finally, in a fourth implementation (see FIG. 4D), there are two separate transmission lines, of which one is connected to the common input, while the other is isolated. Preferably, one of these lines is terminated in a short circuit and the other in an open circuit. In all four implementations, the characteristic impedance, as well as length of the transmission lines, can be altered to achieve desired impedances.

It is also desirable that the two impedances produced by each phase bit sub-circuit are of equal magnitude, but opposite sign, at the target frequency. When all constituent phase bits of the device follow this approach, then the distribution of phases produced by the complete device, having any number of such bits, will have a symmetric distribution. This can be accomplished for the circuits shown in FIGS. 4A-4D by choosing the values $L_1$ and $L_2$ according to:

$$L_2 = \frac{\lambda}{4} - L_1 \tag{3}$$

Wherein λ is the guided wavelength at the target frequency. Note: in the first implementation (FIG. 4A), $L_1 = L_2 = \lambda/8$. Further, in the fourth implementation (FIG. 4D), length $L_1$ can be applied to either the open or short circuit line, as long as the other circuit line is length $L_2$. As will be known to those skilled in the art, the values $L_1$ and $L_2$ can be increased by any integer multiple of λ/2, and retain the described properties.

Figure 4A:
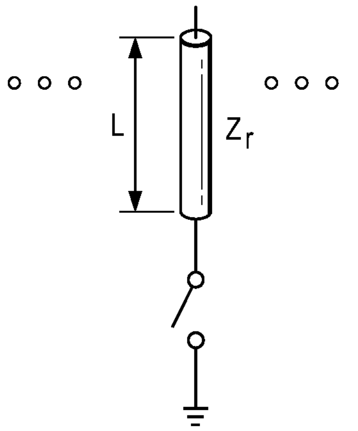
FIGS. 4A-4D depict four example implementations of a binary switchable transmission line circuit, producing two distinct and controllable impedances.
Figure 4B:
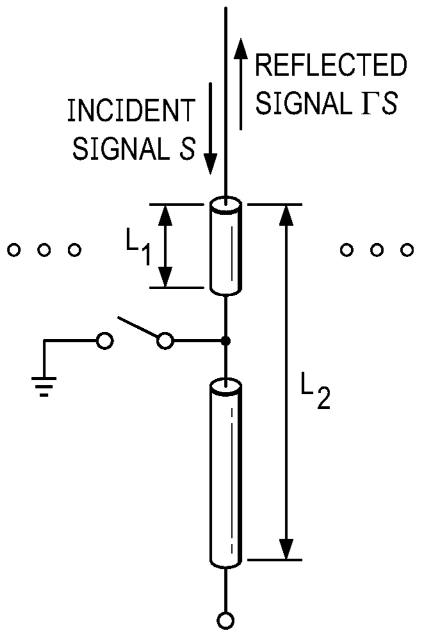
Figure 4C:
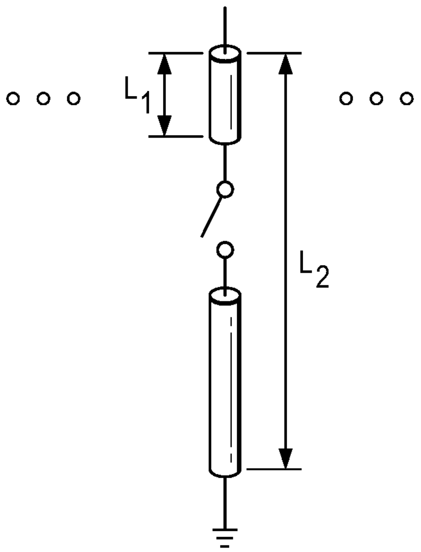
Figure 4D:
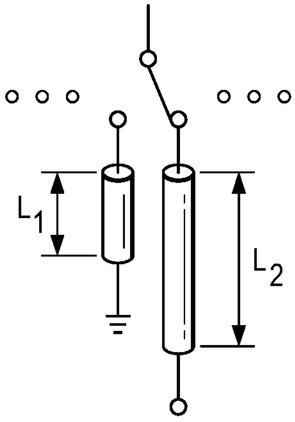
Figure 5A:
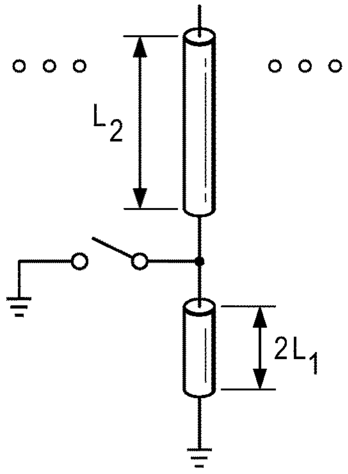
FIGS. 5A-5B depict two example implementations of a binary switchable transmission line circuit usable as a reflective phase bit.
Figure 5B:
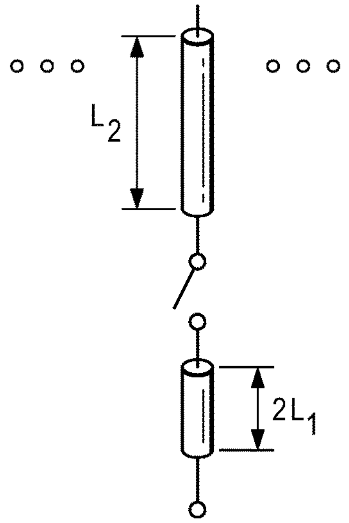

Two additional implementations of a binary switchable transmission line circuit usable as a reflective phase bit are depicted in FIGS. 5A-5B. In the implementation depicted in FIG. 5A, a transmission line terminates in a short circuit and along its length a switch shunts to ground. In the implementation depicted in FIG. 5B, a transmission line terminates in an open circuit and the transmission line is segmented into two section by a series switch. In FIGS. 5A and 5B, the values $L_1$ and $L_2$ are the same $L_1$ and $L_2$ values as those described in FIGS. 4A-4D and Equation (3). The quantity $2L_1$ is twice the length of $L_1$. The implementations depicted in FIGS. 5A-5B may be physically larger than the implementations depicted and described in FIGS. 4A-4D and maintain the same direct current ("DC") electrical state, either grounded, or isolated from ground, respectively, regardless of the switch state.

FIG. 6 depicts an example implementation of the reflective phase shifting device architecture depicted in FIG. 3, utilizing one of the sub-circuit layouts depicted in FIGS. 4A-4D, wherein the circuit parameters are varied across the parallel phase bits, and wherein the depicted device includes 4 bits of phase resolution, thereby producing 16 possible phase states.

Figure 7:
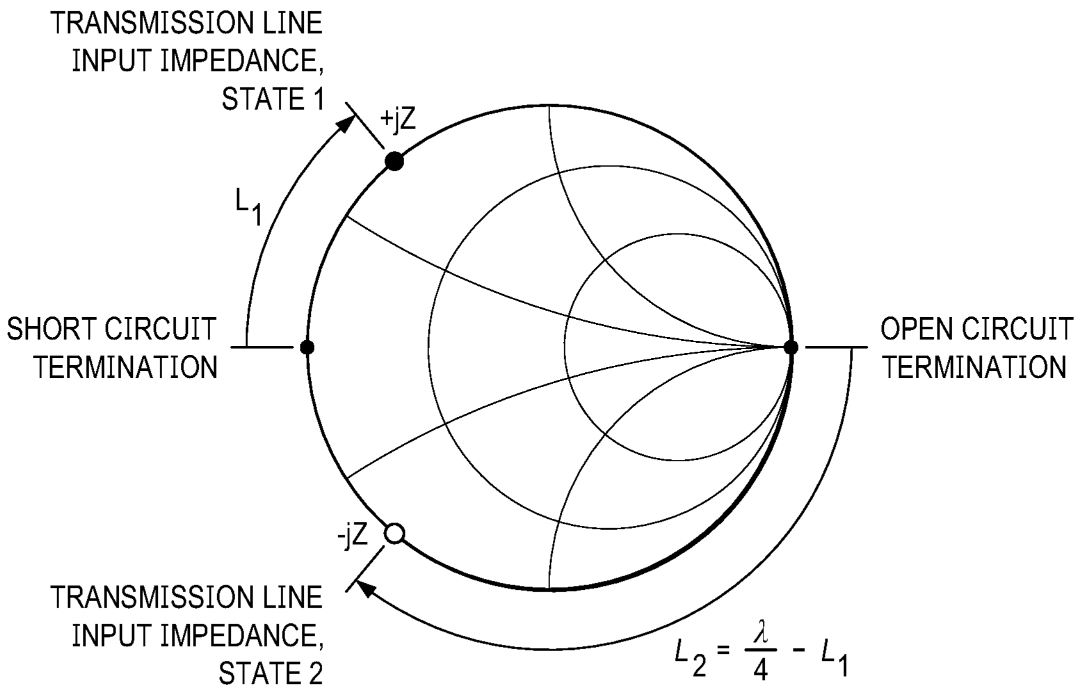
FIG. 7 depicts two impedance states of a single-phase bit plotted on a Smith chart, wherein lengths are indicated for transmission lines terminated in open and short circuits ($L_2$ and $L_1$ respectively), which ensure that the two states have equal magnitude but opposite sign.

Graphical computation of input impedance in the two states is illustrated in FIG. 7, which depicts the two impedance states of a single-phase bit plotted on the Smith chart, wherein lengths are indicated for transmission lines terminated in open and short circuits ($L_2$ and $L_1$ respectively), which ensure that the two states have equal magnitude but opposite sign. In practice, minor adjustment to these values may be made to compensate for any parasitic reactance stemming from the non-ideal switch, open, or short circuit.

Additionally, it is desirable if the phase bits of FIG. 3 are designed such that in at least one state, the inputs of all phase bits are DC-coupled to ground, and in at least one state the inputs of all phase bits are a DC high impedance or open circuit. This set of conditions produces desirable wideband phase control, resulting in a minimum of 1-bit phase resolution as the frequency approaches DC. The specific implementations depicted in FIGS. 4A-4D are all capable of producing DC-open and DC-short responses.

Figure 8:
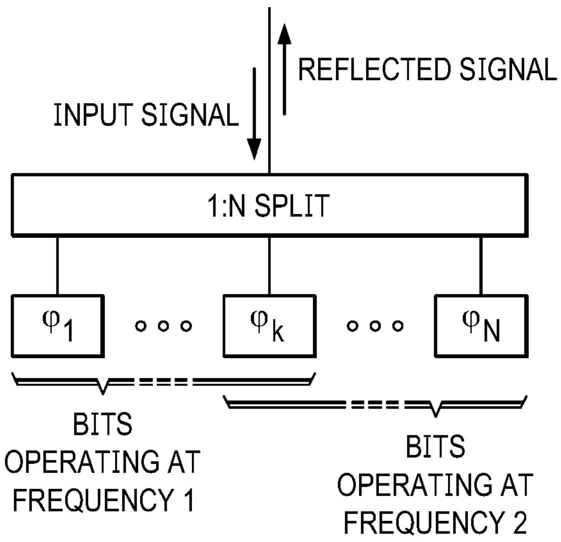
FIG. 8 depicts a reflective phase shifting device that includes a set of parallel sub-circuits (bits), wherein a subset of these bits is operated at a first frequency (f1), and another subset of bits operates at a second frequency (f2), and wherein individual bits may be shared across multiple subsets, and any number of subsets or bits can be implemented.

Operation at multiple frequencies or over a wider bandwidth can be achieved using the disclosed technology by exercising only a subset of the included parallel bits at any given frequency. Ideally, a predetermined number of bits are included in multiple subsets, as shown in FIG. 8, reducing the required hardware. FIG. 8 depicts a reflective phase shifting device that includes a set of parallel sub-circuits (bits), wherein a subset of these bits is operated at first design frequency (f1), and another subset of bits operates at a second frequency (f2), and wherein individual bits may be shared across multiple subsets, and any number of subsets or bits can be implemented.

The disclosed phase shifting device can be packaged as a stand-alone device or may be incorporated into or alongside other electronics. The device may further include digital circuitry for converting a serial data stream into control signals for the parallel phase control bits. The device may also include circuitry for computing or transforming simplified or convenient input signals into required control signals. Selection of appropriate control states based on an input or stored frequency of operation, or computation of control signals producing a phase state closest to an input value may also be included. In any of the disclosed implementations, the transmission lines may be replaced or augmented by capacitors or inductors having the equivalent effect.

Electronically Controlled Reflecting Antenna and Array

Figure 9A:
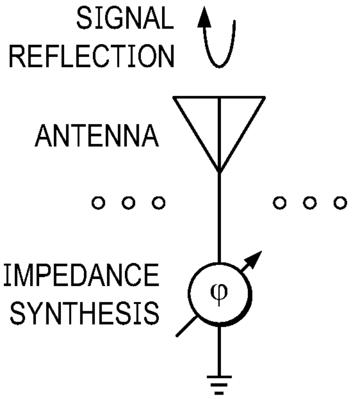
FIGS. 9A-9B depict a reflective phase shifting element or device behaving as an arbitrary impedance synthesis that can be further combined with an antenna element, wherein in FIG. 9A, the antenna is terminated with the phase shifting circuit and the combined system reflects impinging waves with an altered phase, based on the state of the phase shifter circuit, and wherein in FIG. 9B, the antenna conveys signals to and from an external system, and is shunted by the phase shifting circuit.
Figure 9B:
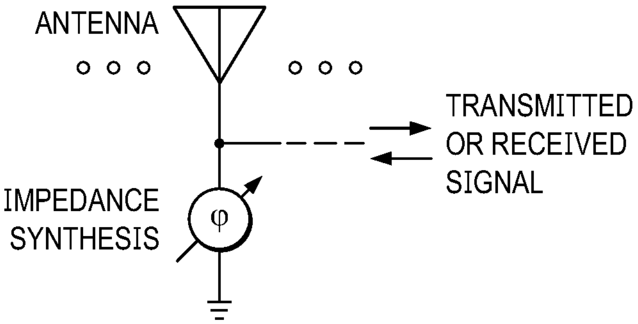

The reflective phase shifting system, element, or device described above can be further combined with an antenna element to form an electronically tunable antenna. Two configurations of such an element are shown in FIGS. 9A-9B. In one implementation (see FIG. 9A), the antenna is terminated with a phase shifting circuit such that the combined system reflects impinging waves with an altered phase, based on the state of the phase shifter circuit. In another implementation (see FIG. 9B), the antenna conveys signals to and from an external system but is shunted by the phase shifting circuit. In this manner, the impedance matching, phase, and frequency of operating of the antenna is tuned by the controllable reactive impedance presented by the phase shifting device. Either of these implementations can be utilized as a single antenna, or as an array of antennas.

Figure 10:
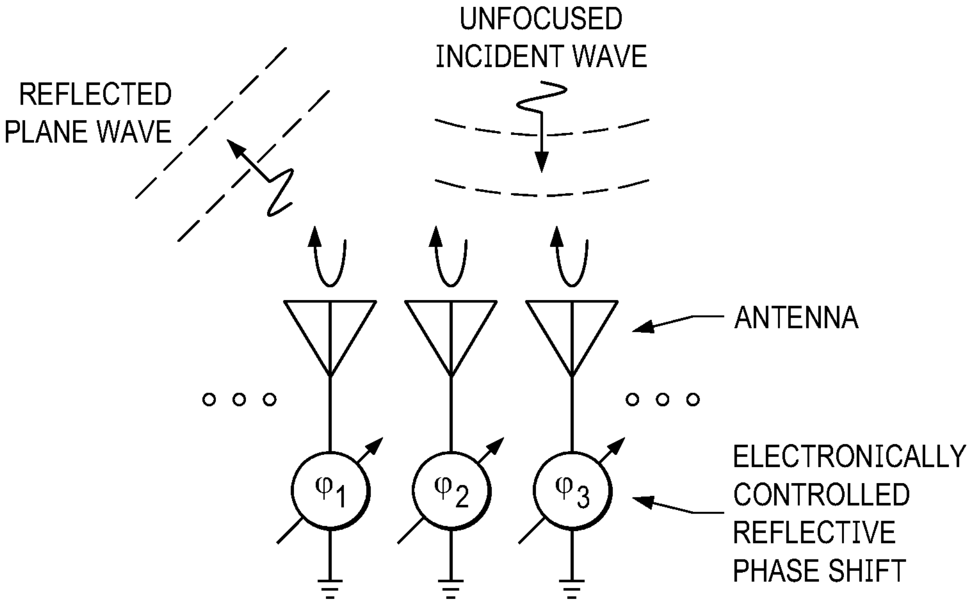
FIG. 10 depicts an array of electronically controlled reflective elements, each comprising an antenna connected to the disclosed reflective phase shifting circuit, wherein through the selection of appropriate phases at each element, incident signals impinging on the array can be steered or focused in one or more desired directions.

In one implementation, an array of antennas is terminated in the reflective phase shifting circuit described above. FIG. 10 depicts an array of electronically controlled reflective elements, each comprising an antenna connected to the disclosed reflective phase shifting circuit, wherein through the selection of appropriate phases at each element, incident signals impinging on the array can be steered or focused in one or more desired directions. Each of these elements is similar in construction, although they may be placed into different electronic states. Electromagnetic waves impinging on this array will reflect from the tunable antennas. Through the selection of appropriate phases at each element, the pattern of the combined reflection from the array can be arbitrarily controlled. Specifically, the array can be used to form a collimated plane wave or beam in one or more desired directions. Conversely, propagation can be prevented, or a null formed in one or more directions. The incident waves can be ambient or of external sources, or be intentional. In one approach, the incident waves are the intentional illumination of the array from a nearby feeding antenna. Further, it is important that virtually all the energy radiated by this feeding antenna is directed at the reflecting array.

The disclosed reflecting array can be further modified such that each element includes the antenna, a static phase adjustment, and the tunable phase shifting circuit. In particular the value of the static phase offset can be designed as a function of the antenna's location within the array, or with respect to its position relative to the illuminating antenna. In one implementation, these fixed phase offsets are designed such that a plane wave is formed by the reflected signals, in the case that all tunable elements are placed in an identical state. More specifically, in another implementation, the static phase offsets are selected such as to normalize the phase of the incident wave that reflected signal at each element of the array has a common phase when in a common control state.

Figure 11A:
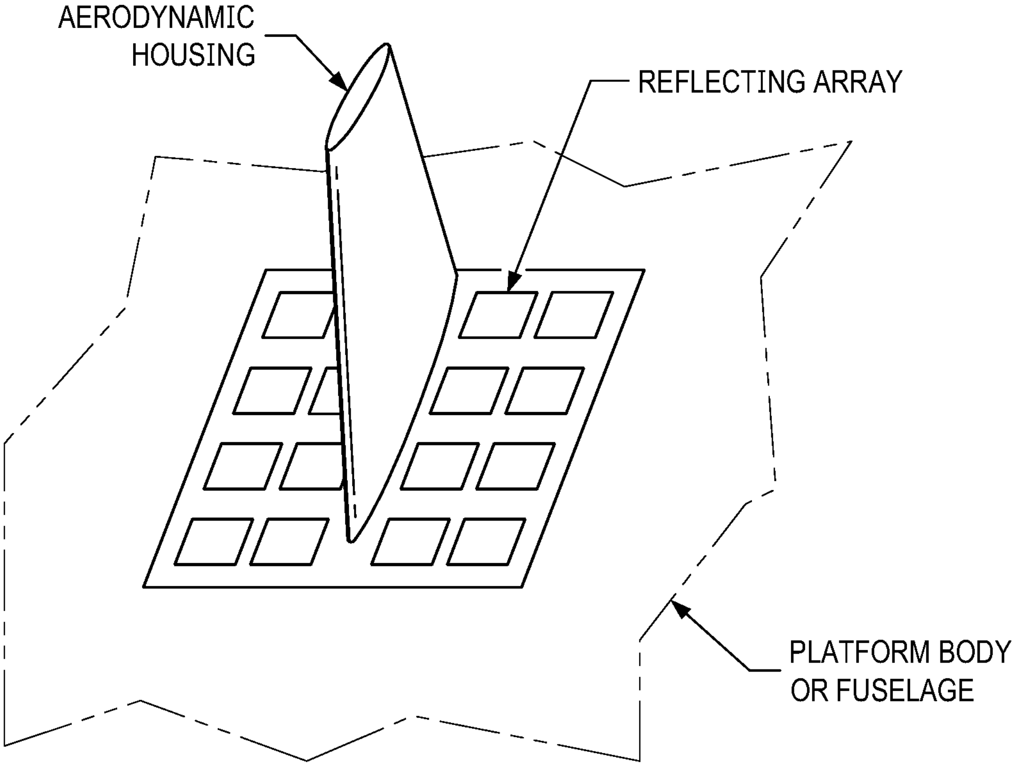
FIGS. 11A-11B depict a perspective view (FIG. 11A) and a side view (FIG. 11B) of an example implementation of the electronically controlled reflecting array of FIG. 10, positioned substantially conformal to the body of a host platform, and having an illuminating feed antenna housed in a protruding aerodynamic structure.
Figure 11B:
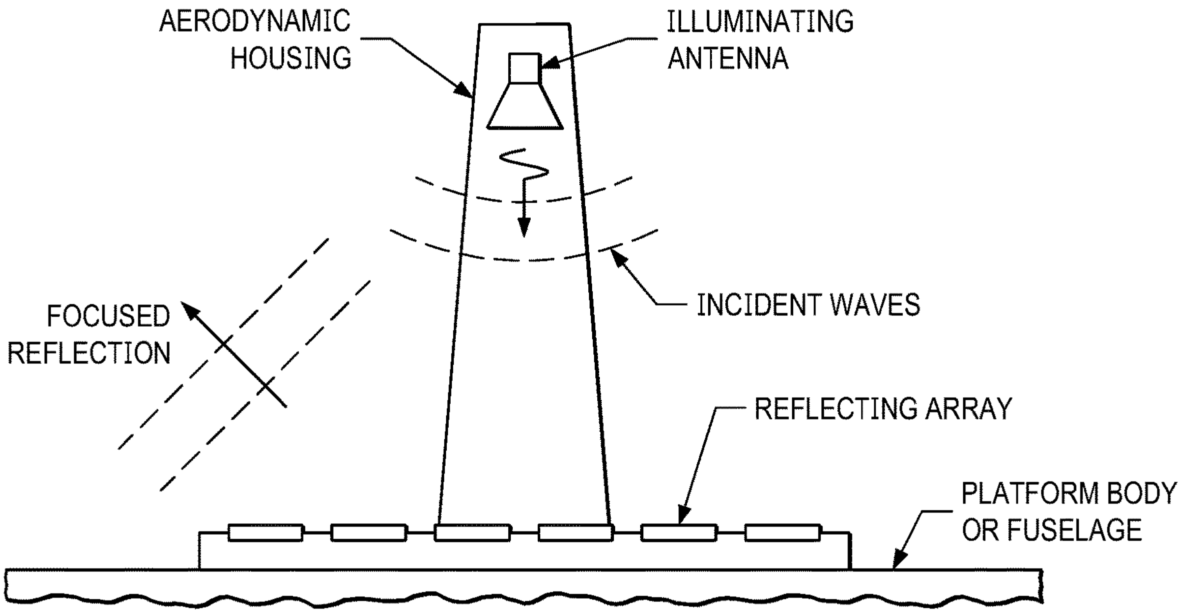

In another implementation, the array of reflecting tunable antennas is placed in a housing conformal against the body or skin of a host platform or substrate, which might include an airplane, ground vehicle, boat, or other craft, as shown in FIGS. 11A-11B. In addition, a stationary illuminating feed antenna is fixed in place above the array by means of a protruding structure, orthogonal to the array. This feed antenna housing should be aerodynamic in exterior shape, and constructed primarily of non-conducting materials to avoid impact to the radiating properties of the feed or array.

Furthermore, a single such aerodynamic housing may contain more than one feed antenna, and the conformal portion of the structure may contain more than one array of reflecting elements. The different feeds or arrays may operate at different frequencies, have differing polarization, be independently controlled, or might be used exclusively for transmission or reception, respectively. In one implementation, an aerodynamic housing contains a first feed antenna, of which virtually all radiated energy illuminates a first conformal array. The same housing contains a second feed antenna, of which virtually all radiated energy illuminates a second conformal array. Both feed antennas and arrays operate simultaneously.

Directional Phase Shifting Device and Antenna Array

Figure 12:
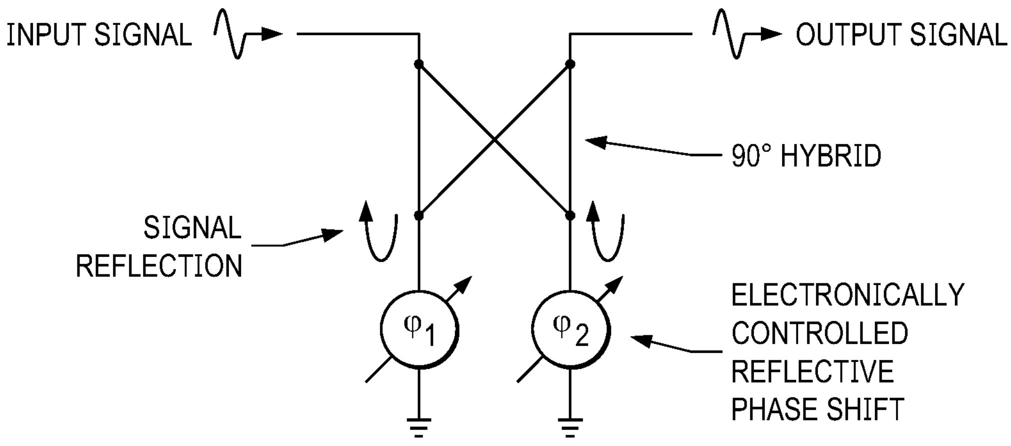
FIG. 12 depicts a circuit producing an output signal with a phase shift with respect to an input signal, using of a pair of reflective phase shifting devices interfaced through a hybrid coupler.

The phase shifting circuit described above is reflective in nature, meaning that the incident and reflected signals are present at the same port. This may not be practical in certain applications, where it is instead desirable to obtain a directional phase shift, namely having the input and phase shifted output at two different ports. This effect can be achieved by placing two reflective phase shifting loads at two non-isolated ports of a 90° hybrid coupler, as shown in FIG. 12. Ideally, the two loads are identical in design, and set to identical states or configuration. These two reflective loads can each be an instance of the disclosed reflective phase shifting device. In doing so, the phase shift produced by the reflective devices is transferred onto the input signal, and the resulting signal is emitted at the output port.

As will be appreciated by one of ordinary skill in the art, the above-described circuit and its subcomponents can be fabricated as any combination of discrete devices and etched copper transmission lines. Also, the circuit can be integrated into or alongside other electronics as a single device, potentially including amplifiers, switches, or filters. In one example configuration, the circuit is combined with an antenna at the second port, such that the signal radiated by the antenna is phase shifted with respect to the signal input to the first port of the circuit. Moreover, the disclosed technology includes an array of the antenna and phase shifter combination, wherein the ports not connected to an antenna are connected to a signal distribution network. Further, in one configuration, the system includes at least antenna, phase shifter, and signal distribution network and contains no unidirectional active electronics such as amplifiers such that the system can be operated bidirectionally (either transmitting or receiving) without reconfiguration.

Subarray Phase Shifter

Figure 13:
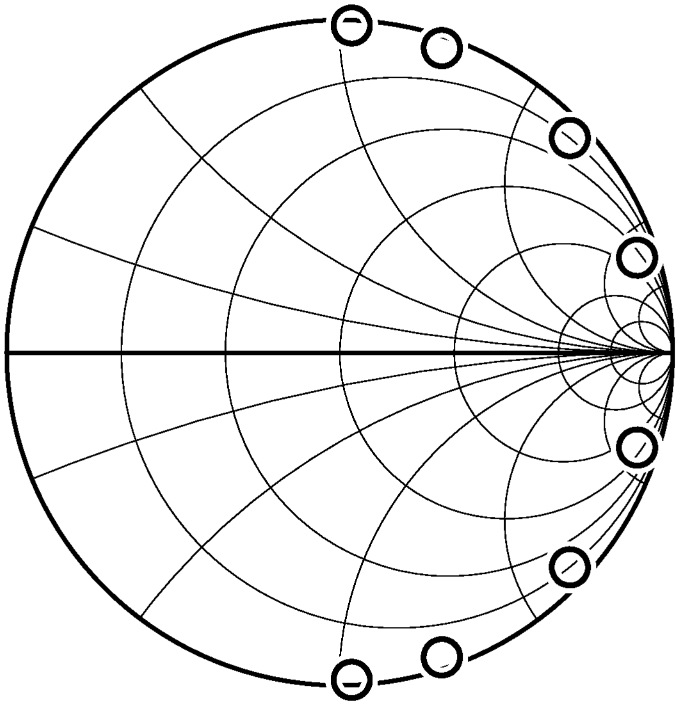
FIG. 13 depicts input impedance of eight (8) states of a 3-bit phase shifter plotted on a Smith chart, wherein the resultant phase angle of all states are constrained to a contiguous $180^0$ range.

The directional phase shifter described above is designed to produce an approximately 360° range of possible phase shifts across all the possible phase states. However, the full 360° range of possible phase shifts may not be necessary in certain applications. In such applications, the performance of the phase shifter can be improved by concentrating some or all of the possible phase states into a range less than 360°. Such improvements to the performance of the phase shifter can include increasing bandwidth, decreasing loss, and increasing resolution, among others. Ideally, the possible phase states may lie in a contiguous range. This effect can be achieved by centering the range of possible phase shifts at the open or short circuited point, with an approximately 180° contiguous span, as shown in FIG. 13. FIG. 13 depicts input impedance of eight (8) states of a 3-bit phase shifter plotted on a Smith chart, wherein the resultant phase angle of all states are constrained to a contiguous $180^0$ range.

Figure 14:
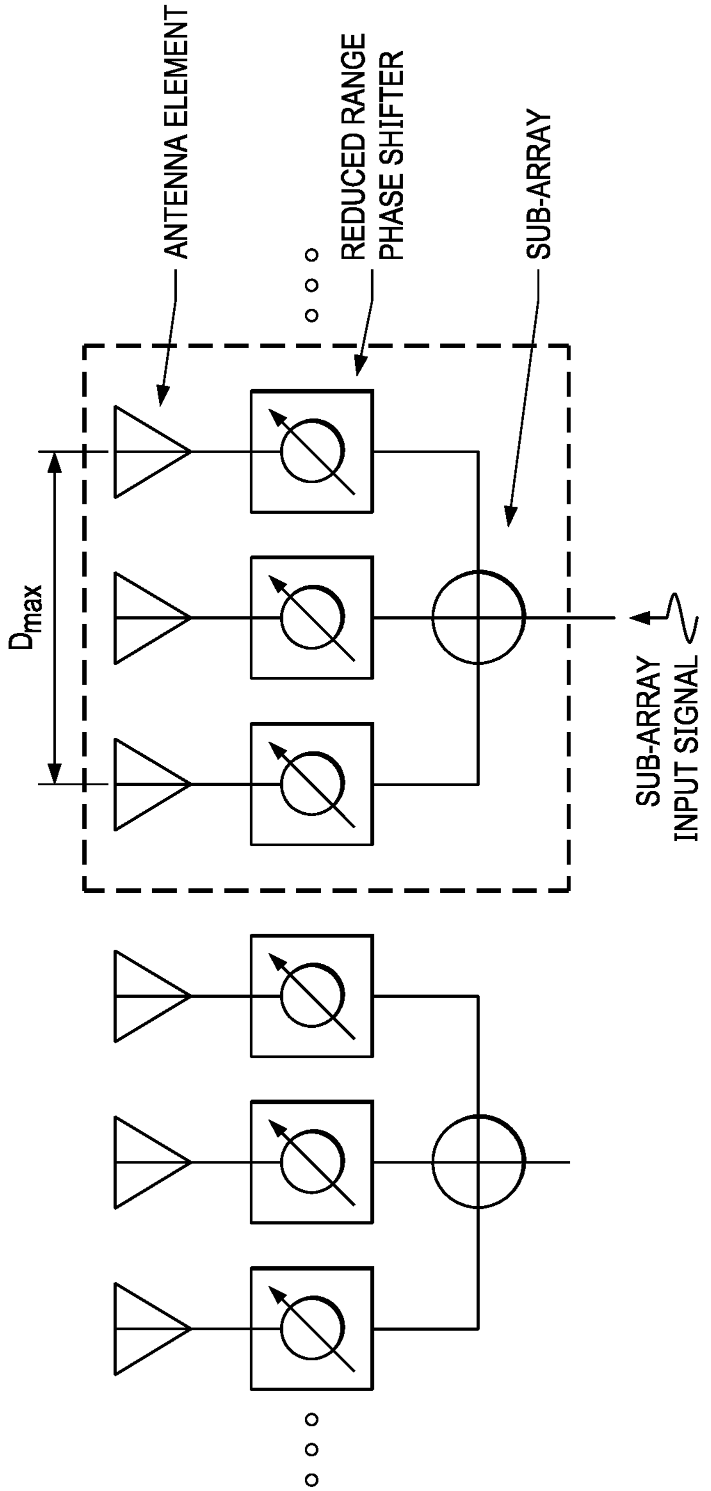
FIG. 14 depicts multiple subarray systems each comprising a collection of antennas connected to phase shifters having a reduced operating range.

The disclosed subarray phase shifter system may be configured to include multiple antennas, wherein each antenna is connected to at least one phase shifter having a reduced operating range, and wherein the at least one phase shifter is connected to a common signal path, as shown in FIG. 14. In FIG. 14, the number of antennas and the number of phase shifters are configured to include between 2-8 antennas and between 2-8 phase shifters. Each phase shifter connected to the common signal path may have the same phase range.

Multiple subarray phase shifter systems can be combined to form a larger array, wherein the shared signal path of each individual subarray is not necessarily shared between subarrays. The approximate extent of the reduced phase range of the phase shifter may be related to the physical placement of the antenna elements in the sub-array, as described by:

$$\phi_r = 360^\circ \frac{D_{max} \sin\theta_{max}}{\lambda} \tag{4}$$

wherein $\phi_r$ is the contiguous phase range of the phase shifter, $D_{max}$ is the largest physical separation of any two antennas within the sub-array, $\theta_{max}$ is the maximum required scanning angle from broadside for the array, and $\lambda$ is the free-space wavelength at the target frequency.

Figure 15:
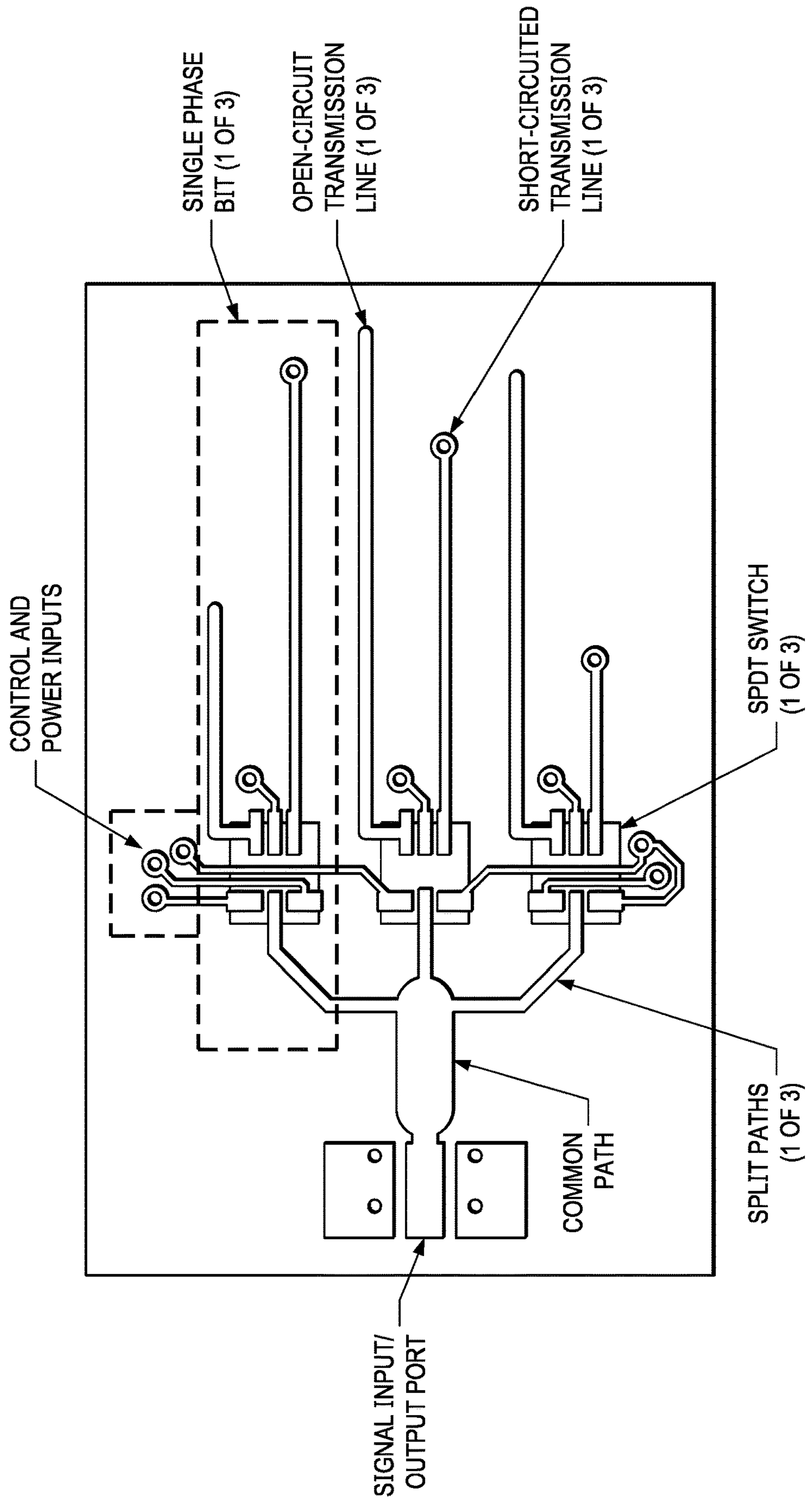
FIG. 15 depicts an example layout of a printed circuit board (PCB) implementation of the 3-bit reflective phase shifter depicted in FIG. 3, utilizing three instances of the phase bit circuit detailed in FIG. 4D, wherein a uniform metal groundplane is situated on the opposite side of the substrate.

With regard to specific implementations of the disclosed phase shifting technology, FIG. 15 depicts an example layout of a printed circuit board (PCB) implementation of the 3-bit reflective phase shifter depicted in FIG. 3, utilizing three instances of the phase bit circuit detailed in FIG. 4D, wherein a uniform metal groundplane is situated on the opposite side of the substrate. The PCB depicted in FIG. 15 includes a signal input/output port; a common path; three split paths; control and power inputs; three single phase bits; three open-circuit transmission lines; three short-circuited transmission lines; and three single pole double throw (SPDT) switches.

Figure 16:
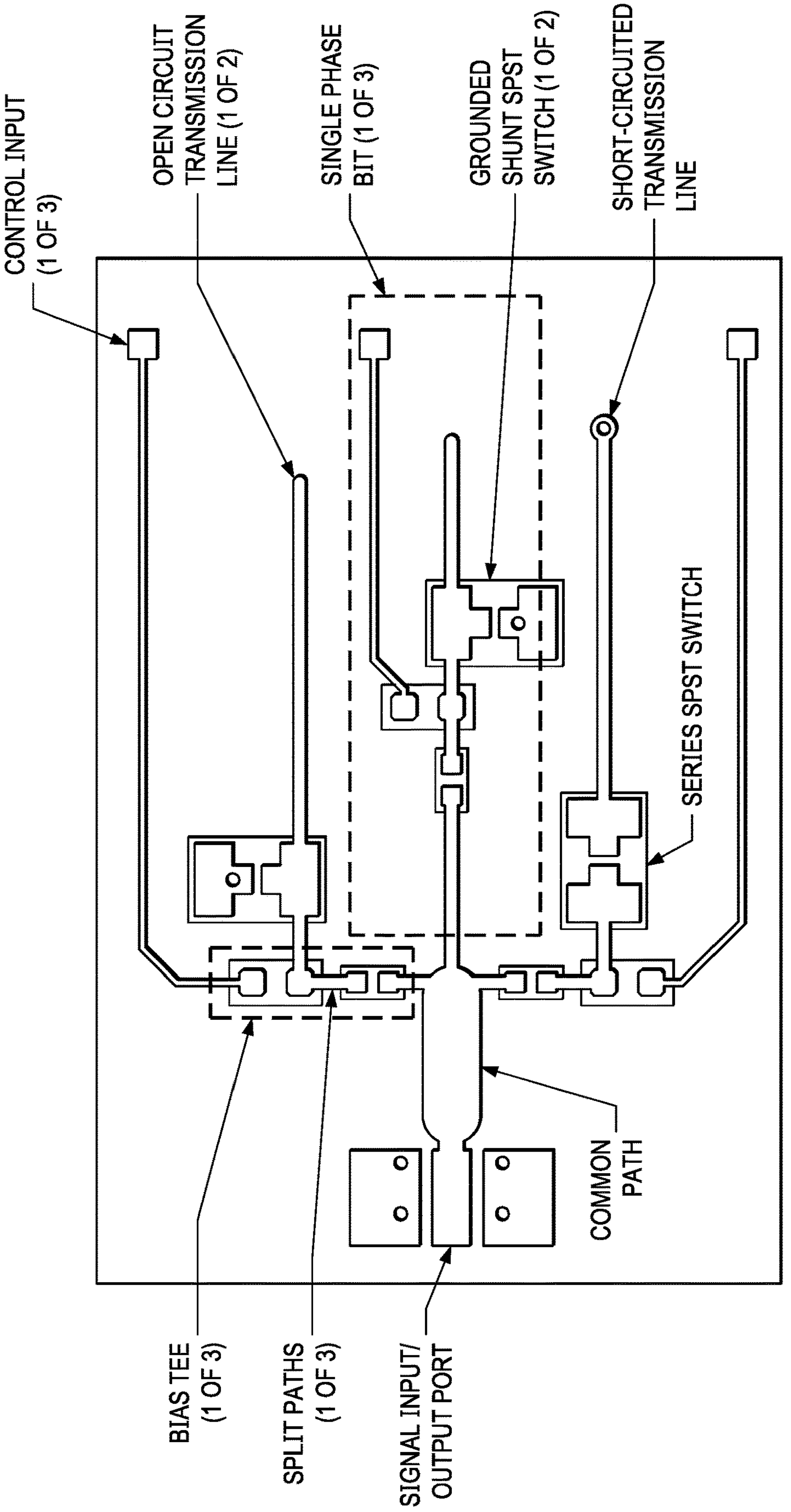
FIG. 16 depicts an example layout of the PCB implementation of the 3-bit reflective phase shifter depicted in FIG. 3, combining one instance of the phase bit circuit detailed in FIG. 4C and two instances of the phase bit circuit detailed in FIG. 4B, wherein a uniform metal groundplane is situated on the opposite side of the substrate.

Also with regard to specific implementations of the disclosed phase shifting technology, FIG. 16 depicts an example layout of a printed circuit board (PCB) implementation of the 3-bit reflective phase shifter depicted in FIG. 3, combining one instance of the phase bit circuit detailed in FIG. 4C and two instances of the phase bit circuit detailed in FIG. 4B, wherein a uniform metal groundplane is situated on the opposite side of the substrate. The PCB depicted in FIG. 16 includes a signal input/output port; a common path; three split paths; three bias tees; three control inputs; two open circuit transmission lines; three single phase bits; two grounded shunt single pole single throw (SPST) switches; a short-circuited transmission line; and a series SPST switch.

Figure 17A:
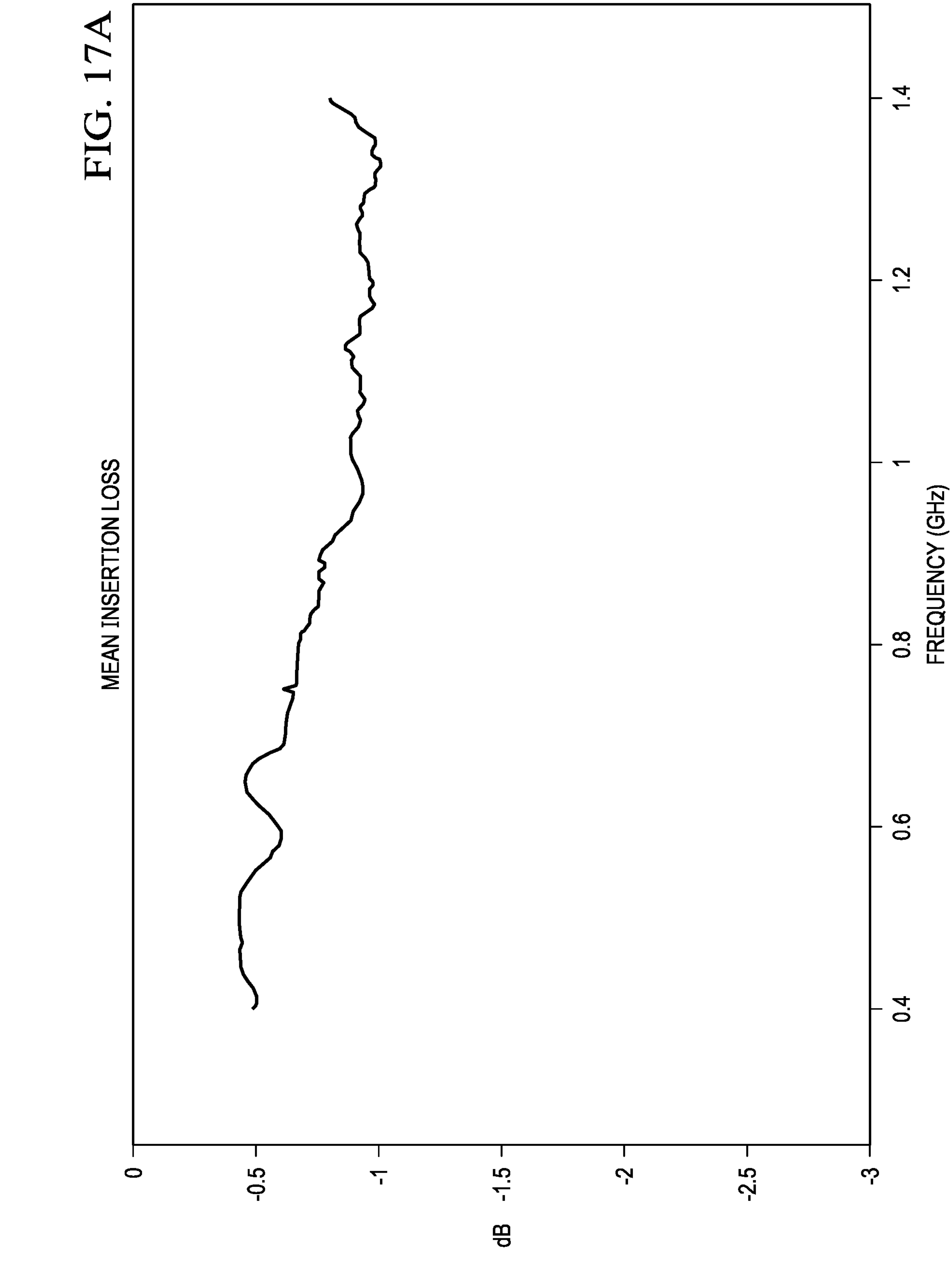
Figure 17B:
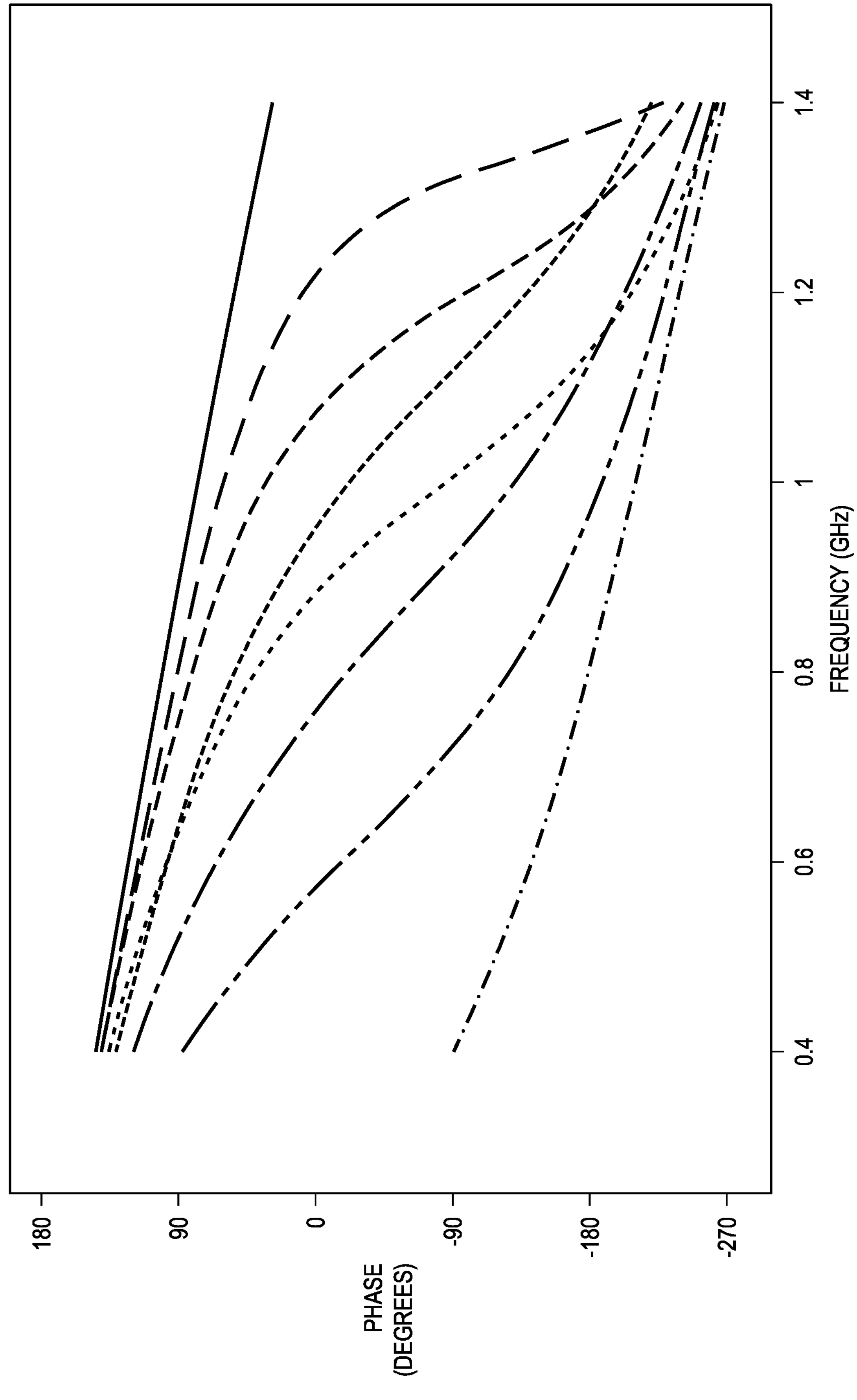
Figure 17C:
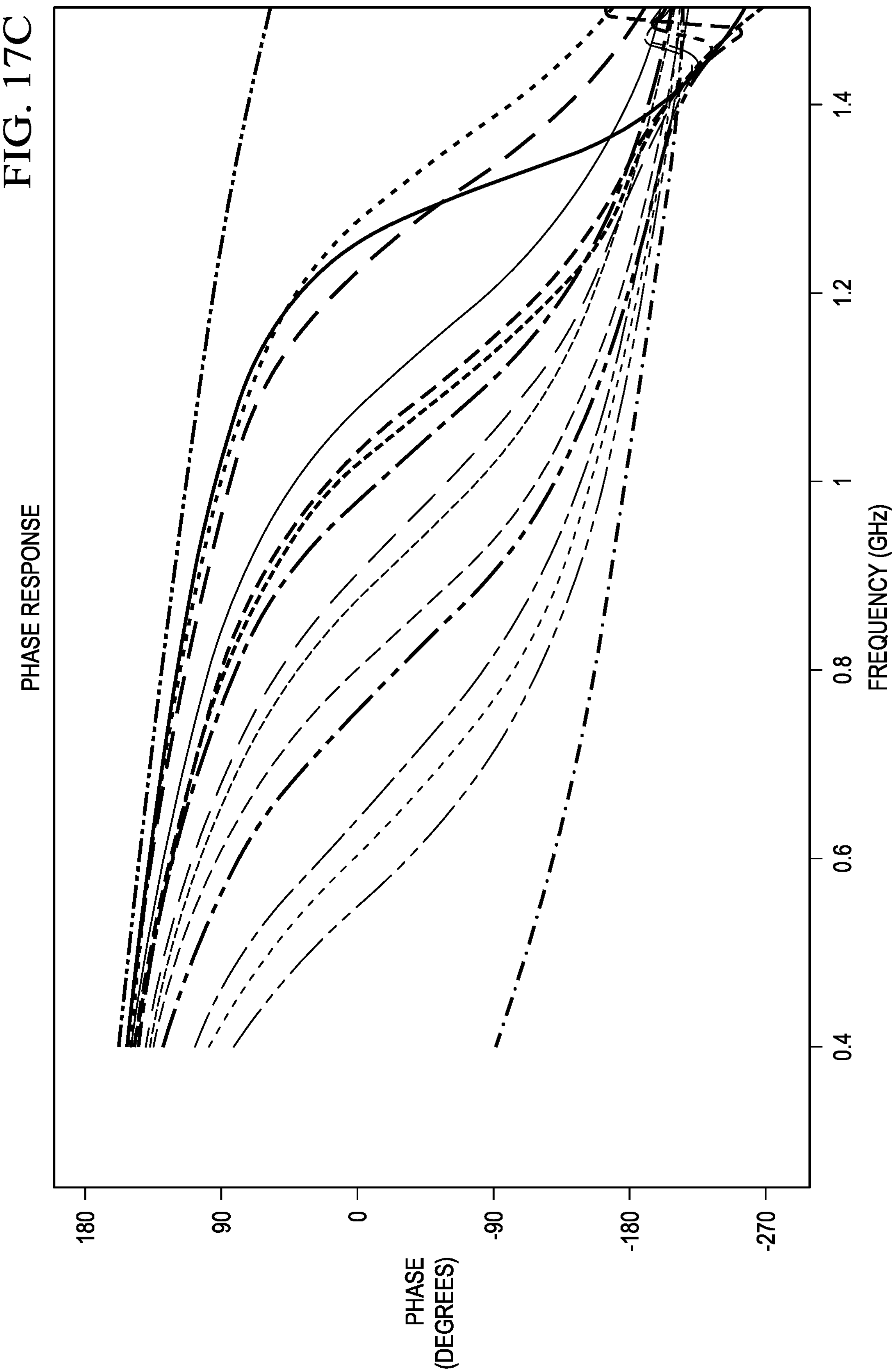

FIGS. 17A-17C provide measurement data graphs of phase shifters implementing the disclosed reflective phase shifting device architecture. FIG. 17A depicts the measured insertion loss of a 3-bit reflective phase shifter, averaged across all phase states. FIG. 17B depicts the measured phase response of a 3-bit reflective phase shifter where each curve represents a different selectable phase state, and the 3-bit device produces 8 unique phase states. FIG. 17C depicts the measured phase response of a 4-bit phase shifter where each curve represents a different selectable phase state, and the 4-bit device produces 16 unique phase states.

The disclosed implementations are described in the context of radio frequency waves, but similar devices and transducer arrays can be implemented in the acoustic or optical domains, as will be appreciated by those skilled in the art.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A system, comprising:

(a) a device including a circuit configured to produce a phase shift in a reflected signal,
  (i) wherein a plurality of phase bits are situated in parallel relative to one another within the device,
  (ii) wherein each phase bit operates on a fraction of incident signal power, and
  (iii) wherein reflections from all parallel phase bits are recombined into a single signal reflected from the device; and (b) at least one sub-circuit having at least one binary switched phase bit, wherein the at least one sub-circuit is configured as a transmission line circuit, wherein a transmission line of the transmission line circuit terminates in an open circuit and a switch is shunted to ground along a length thereof, and wherein when in a conducting state, the transmission line is shorted with a reduced effective length, and when in an isolating state, the connection to ground is blocked and the open termination and full length of the transmission line determines an impedance of the device.

2. The system of claim 1, wherein the device comprises one to N switchable parallel phase bits, wherein each bit is switchable between two states, and wherein the reflection from the circuit can take on $2^N$ unique phase states, which are widely distributed from 0-360°.

3. The system of claim 2, wherein the value of N spans 3-8 switchable phase bits.

4. The system of claim 1, wherein the system is configured for use with radio frequency waves, acoustic domains, or optical domains.

5. The system of claim 1, wherein the system is configured for use with an integrated circuit.

6. A system, comprising:

(a) a device including a circuit configured to produce a phase shift in a reflected signal,
  (i) wherein a plurality of phase bits are situated in parallel relative to one another within the device,
  (ii) wherein each phase bit operates on a fraction of incident signal power, and
  (iii) wherein reflections from all parallel phase bits are recombined into a single signal reflected from the device; and (b) at least one sub-circuit having at least one binary switched phase bit, wherein the at least one sub-circuit is configured as a transmission line circuit, wherein the transmission line circuit terminates in a short circuit, and wherein the transmission line circuit is segmented into two sections by a series switch.

7. A system, comprising:

(a) a device including a circuit configured to produce a phase shift in a reflected signal,
  (i) wherein a plurality of phase bits are situated in parallel relative to one another within the device,
  (ii) wherein each phase bit operates on a fraction of incident signal power, and (iii) wherein reflections from all parallel phase bits are recombined into a single signal reflected from the device; and (b) at least one sub-circuit having at least one binary switched phase bit, wherein the at least one sub-circuit is configured as a transmission line circuit, wherein a first transmission line of the transmission line circuit is connected to a common input, wherein a second transmission line of the transmission line circuit is isolated, wherein one of the first and second transmission lines is terminated in a short circuit, and wherein the other transmission line is terminated in an open circuit.

8. A system, comprising:

(a) a device including a circuit configured to produce a phase shift in a reflected signal, (i) wherein a plurality of phase bits are situated in parallel relative to one another within the device, (ii) wherein each phase bit operates on a fraction of incident signal power, and (iii) wherein reflections from all parallel phase bits are recombined into a single signal reflected from the device; and (b) at least one sub-circuit having at least one binary switched phase bit, wherein the at least one sub-circuit is configured as a transmission line circuit, wherein a transmission line of the transmission line circuit terminates in a short circuit, and wherein along a length of the transmission line a switch shunts to ground.

9. A system, comprising:

(a) a device including a circuit configured to produce a phase shift in a reflected signal (i) wherein a plurality of phase bits are situated in parallel relative to one another within the device, (ii) wherein each phase bit operates on a fraction of incident signal power, and (iii) wherein reflections from all parallel phase bits are recombined into a single signal reflected from the device; and (b) at least one sub-circuit having at least one binary switched phase bit, wherein the at least one sub-circuit is configured as a transmission line circuit, wherein a transmission line of the transmission line circuit terminates in an open circuit, and wherein the transmission line is segmented into two sections by a series switch.

10. A system, comprising:

(a) a device including a circuit configured to produce a phase shift in a reflected signal, (i) wherein a plurality of phase bits are situated in parallel relative to one another within the device, (ii) wherein each phase bit operates on a fraction of incident signal power, and iii) wherein reflections from all parallel phase bits are recombined into a single signal reflected from the device; and (b) wherein the at least one phase bits are configured such that in at least one state inputs of all of the plurality of phase bits are DC-coupled to ground, and in at least one other state inputs of all of the plurality of phase bits are a DC high impedance or open circuit.

11. A system, comprising:

(a) a device including a circuit configured to produce a phase shift in a reflected signal (i) wherein a plurality of phase bits are situated in parallel relative to one another within the device, (ii) wherein each phase bit operates on a fraction of incident signal power, and (iii) wherein reflections from all parallel phase bits are recombined into a single signal reflected from the phase shifting device; and (b) wherein the device includes a set of parallel sub-circuit bits, wherein a subset of bits of the set of parallel sub-circuit bits is operated at a first frequency (f1), and another subset of bits of the set of parallel sub-circuit bits operates a second frequency (f2), and wherein individual bits of the set of parallel sub-circuit bits may be shared across multiple subsets, and any number of subsets or bits of the set of parallel sub-circuit bits can be implemented.

* * * * *